United States Patent
Khlifi

(10) Patent No.: US 11,679,765 B2
(45) Date of Patent: Jun. 20, 2023

(54) METHOD FOR OPERATING A DISTANCE-MEASURING SURROUNDINGS SENSOR OF A MOTOR VEHICLE AND MOTOR VEHICLE

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 144 days.

(21) Appl. No.: 17/104,406

(22) Filed: Nov. 25, 2020

(65) Prior Publication Data

US 2021/0188265 A1 Jun. 24, 2021

(30) Foreign Application Priority Data

Dec. 20, 2019 (DE) .......................... 102019135405.6

(51) Int. Cl.
| | |
|---|---|
| *B60W 30/095* | (2012.01) |
| *B60W 30/18* | (2012.01) |
| *G01S 13/931* | (2020.01) |
| *G01S 17/931* | (2020.01) |
| *H04W 4/46* | (2018.01) |

(52) U.S. Cl.
CPC .. *B60W 30/0956* (2013.01); *B60W 30/18163* (2013.01); *G01S 13/931* (2013.01); *G01S 17/931* (2020.01); *H04W 4/46* (2018.02); *B60W 2420/52* (2013.01)

(58) Field of Classification Search
CPC ....... B60W 30/0956; B60W 30/18163; B60W 2420/52; H04W 4/46; G01S 17/931; G01S 13/931
See application file for complete search history.

(56) References Cited

U.S. PATENT DOCUMENTS

2016/0003946 A1* 1/2016 Gilliland ............... G01S 17/894
356/5.01
2020/0174487 A1* 6/2020 Viswanathan ....... G05D 1/0221
(Continued)

FOREIGN PATENT DOCUMENTS

| DE | 10323639 A1 | 12/2004 |
|---|---|---|
| DE | 102008061747 A1 | 6/2009 |

(Continued)

OTHER PUBLICATIONS

German Examination Report dated Aug. 11, 2020 in corresponding German Application No. 102019135405.6 12 pages; Machine translation attached.

*Primary Examiner* — Peter D Nolan
*Assistant Examiner* — Demetra R Smith-Stewart
(74) *Attorney, Agent, or Firm* — Maier & Maier, PLLC

(57) ABSTRACT

A method for operating at least one distance-measuring surroundings sensor, in particular a radar sensor and/or a lidar sensor, of a motor vehicle. The surroundings sensor measures in an adaptable detection region by emitting a transmission signal and receiving a reception signal resulting due to reflection of the transmission signal. The detection region is adapted in dependence on an item of traffic information describing at least one further road user, in particular a further motor vehicle, in relation to the ego motor vehicle to reduce interference between the surroundings sensor of the motor vehicle and at least one surroundings sensor of the further road user.

13 Claims, 2 Drawing Sheets

(56) References Cited

U.S. PATENT DOCUMENTS

Figure 1:
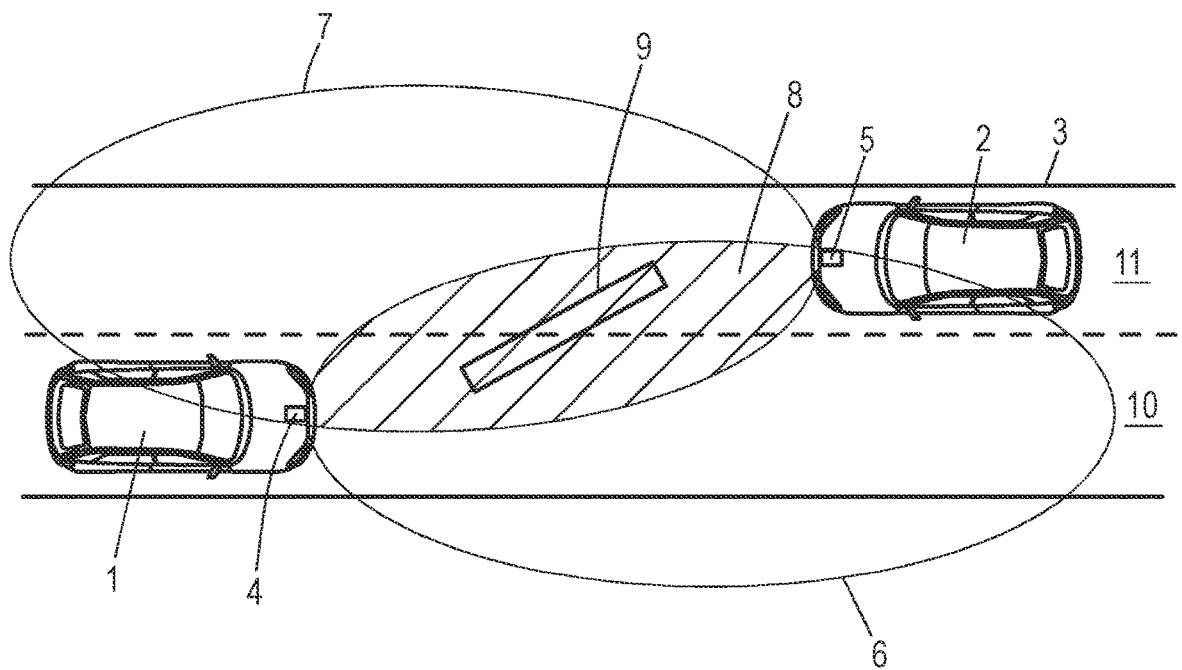

| | | | | |
|---|---|---|---|---|
| 2020/0250437 A1* | 8/2020 | Rahimpour | ............ | G06V 20/58 |
| 2021/0199755 A1* | 7/2021 | Emadi | ........................ | G01S 7/03 |
| 2021/0199787 A1* | 7/2021 | Emadi | ..................... | G01S 13/53 |

FOREIGN PATENT DOCUMENTS

| | | |
|---|---|---|
| DE | 102013109071 A1 | 2/2015 |
| DE | 102015221911 A1 | 5/2017 |
| DE | 102017109037 A1 | 10/2018 |
| DE | 102017216435 A1 | 3/2019 |

* cited by examiner

METHOD FOR OPERATING A DISTANCE-MEASURING SURROUNDINGS SENSOR OF A MOTOR VEHICLE AND MOTOR VEHICLE

FIELD

The invention relates to a method for operating at least one distance-measuring surroundings sensor, in particular a radar sensor and/or a lidar sensor, of a motor vehicle, wherein the surroundings sensor measures in an adaptable detection region by emitting a transmission signal and receiving a reception signal resulting due to reflection of the transmission signal. The invention furthermore relates to a motor vehicle.

BACKGROUND

Modern vehicle systems, in particular driver assistance systems, frequently evaluate sensor data relating to the surroundings of the motor vehicle from various surroundings sensors in various vehicle functions. The detection of dynamic and static objects in the surroundings of the ego motor vehicle plays an important role in this case. Depending on the objects in the surroundings of the motor vehicle that are recognized and described by the sensor data, an assessment of the traffic situation can be carried out and, in particular if at least one measure criterion is met, a measure can be triggered, for example a warning can be output to a driver and/or a driving intervention can be carried out. The objects can be transferred as punctiform obstacles and/or extended targets to further processing units in a control device.

In order to avoid false or incorrect triggering in complex traffic situations, the requirement placed on the performance of the surroundings sensors, in particular with regard to the resolution and the accuracy, is very high. Radar sensors are often used as distance sensors, i.e., distance-measuring surroundings sensors, for various driver assistance systems, since radar technology offers the advantage of providing distance, velocity, and angle of the objects in a single cycle. The ability to detect and separate multiple targets in a complex traffic scenario is also important for assessing the performance of surroundings sensors, wherein a distinction is made, for example, in radar signal processing between distance, velocity, and angle separation abilities. The ability to separate is also interpreted as resolution. The distance resolution is dependent on the emitted frequency bandwidth, the velocity resolution is dependent on the measurement duration, and the angular resolution is dependent on the design of the antenna arrangement, in particular its antenna size. Comparable with radar sensors, lidar sensors are currently also being proposed more frequently as distance-measuring surroundings sensors.

The problem with the use of actively measuring surroundings sensors, which usually emit transmission signals in a certain frequency band and measure the transmission signals reflected on an object or obstacle again as reception signals, is the possibility that when using several similar surroundings sensors that operate in the same frequency band, mutual interference of the surroundings sensors or mutual negative influence can occur. This can be noticeable in the sensor data, for example, due to the generation of ghost targets and/or due to a reduction in the sensitivity of the surroundings sensors due to increased noise. This is particularly problematic when the sensor data are evaluated by a vehicle system designed for at least partially, in particular completely, automatic guidance of the motor vehicle. For example, incorrect maneuvers can occur due to ghost targets or weakly reflecting targets can no longer be recognized due to the increased noise, which would mean a lack of triggering in assisted and/or piloted vehicle functions.

Radar sensors presently used in motor vehicles operate in the so-called 77 GHz frequency band, which describes the frequency range between 76 and 81 GHz. While in the past only 1 GHz frequency bandwidth in the 76 to 77 GHz range was often used, radar sensors are now also to be used that use the entire frequency band in the 76 to 81 GHz range, which increases the probability of mutual interference between individual radar sensors. Similar problems can occur with lidar sensors or other actively measuring surroundings sensors.

DE 103 23 639 A1 relates to a method and a device for detecting an object with adaptive adaptation of detection properties of a detection device. Loc. cit. discusses the problem that when the vehicle is fully loaded or if gravel is present, ground echoes are detected, which can lead to incorrect information in the application of parking space measurement. It is proposed loc. cit., for example, that a maximum spatial detection region be adapted to a spatially smaller detection region in order to advantageously enable simple adaptation to external boundary conditions, in particular to thus avoid reflection on gravel.

DE 10 2017 109 037 A1 discloses an antenna arrangement having adaptable phase relationship for setting the emission characteristic, wherein the antenna arrangement comprises a supply network by means of which the high-frequency antennas can be connected to a transmitting unit and/or a receiving unit. Beamforming for adapting the emission characteristics of a radar sensor to a particular intended use can be carried out by way of the supply network.

SUMMARY

The invention is based on the object of specifying a possibility for reducing the mutual interference of actively measuring radar sensors of different road users, in particular motor vehicles.

To achieve this object, it is proposed according to the invention in a method of the type mentioned at the outset that the detection region is adapted in dependence on an item of traffic information describing at least one further road user, in particular a further motor vehicle, in relation to the ego motor vehicle to reduce interference between the surroundings sensor of the motor vehicle and at least one surroundings sensor of the further road user.

The invention is therefore based on the concept of increasing the interference resistance of surroundings sensors of different motor vehicles by adaptive/situational adaptation of the emission characteristic, in particular thus the emission region. The emission region, which corresponds to the current detection region, of the surroundings sensors is changed in dependence on an item of traffic information describing a further road user in the relevant surroundings, for example when there is oncoming traffic, in such a way that the surroundings sensor of the further road user is not disturbed and ideally vice versa. Various options have already been proposed in the prior art for adapting the emission region, and therefore the detection region. Specifically, especially in the case of radar sensors, it can thus be provided that the detection region is adapted by digital beamforming, in particular using phase shifters in a transmission path of the surroundings sensor, and/or by adapting the transmission power. The phase shifters can be provided, for example, in a front end of the surroundings sensor, in particular a radar sensor, wherein a modification of the emission power primarily influences the range of the emission. The surroundings sensor ideally has an antenna arrangement which comprises multiple antenna elements actuatable independently or with different phases. In this way it is possible to adapt the emission characteristic of the surroundings sensor in such a way that ultimately a certain power distribution results which defines the detection region.

The traffic information expediently comprises a position and orientation of the further road user in relation to the motor vehicle. In this way it can be assessed whether surroundings sensors arranged on the further road user are at least very likely to be disturbed. The traffic information can particularly advantageously be determined at least partially from sensor data from the at least one surroundings sensor itself and/or from a further surroundings sensor of the motor vehicle. In the field of radar and/or lidar technology, it is easily possible to determine distances and directions to detected objects. For example, in the field of radar technology, there are now a large number of approaches that also make it possible to identify detected objects as further road users, in particular further motor vehicles, and/or even classify them more accurately. Since it is common in modern motor vehicles to merge sensor data from different surroundings sensors in the sense of a sensor and/or information fusion already, sensor data from other surroundings sensors can of course also be used, in particular to assist sensor data from the at least one surroundings sensor itself.

In a particularly advantageous refinement of the present invention, the traffic information can additionally or alternatively also be determined from communication data of a communication device of the motor vehicle, in particular by motor vehicle-to-motor vehicle communication. By means of motor vehicle-to-motor vehicle communication (Car2Car or c2c), road users can not only exchange their respective positions, velocities, and further data with each other, for example, but it is also possible in particular to inform other road users whether and to what extent distance-measuring radar sensors are provided on board the motor vehicle, wherein this surroundings information expediently also has items of information attached on the arrangement and alignment of the corresponding surroundings sensor and/or the frequency band used. In this way, it is particularly easily possible for a motor vehicle receiving corresponding communication data to compile the traffic information in such a way that it can be checked, within the ego motor vehicle, whether and to what extent ego distance-measuring surroundings sensors could negatively affect the function of distance-measuring surroundings sensors of further road users, the transmitter of the communication data, in this case. Since an item of ambient sensor information that is received as communication data can ideally also contain the frequency bands used, motor vehicle-to-motor vehicle communication therefore provides an excellent basis for assessing whether and to what extent an adaptation of the emission characteristic, i.e., the detection region, for the at least one surroundings sensor of the ego motor vehicle should take place.

It is expedient if the traffic information is also ascertained comprising a movement velocity and/or a movement direction of the at least one further road user. If the traffic information temporarily cannot be determined, for example, this makes it possible, so to speak, to calculate in advance how the further road user will move in the future in order to be able to adapt the detection region in real time as sensibly and accurately as possible.

In a particularly advantageous design of the present invention, it is provided that the adaptation of the detection region takes place in dependence on an item of classification information contained in the traffic information and/or derivable from it and describing the traffic relationship between the motor vehicle and the further road user. In other words, the role that the further road user plays in the current traffic situation with regard to the ego motor vehicle can be taken into consideration, since this also shows in particular the extent to which it is essential that the at least one surroundings sensor of the ego motor vehicle continues to observe the further road user more or less completely as an object. In this way, a traffic-situation-related adaptation of the detection region of surroundings sensors can take place on the basis of the traffic information, in particular in real time.

In the case of an item of classification information describing a further road user approaching in another lane, the detection range of the surroundings sensor can preferably be adapted to at least partially omit the lane of the further road user. Specifically, it can be provided that the portion of the lane of the further road user removed from the detection region is located in front of the latter and/or includes an ascertained detection region of the at least one surroundings sensor of the further road user on this lane. In other words, the emission characteristic of an ego surroundings sensor can be adapted in such a way that a surroundings sensor of an oncoming motor vehicle is not disturbed. The shape of the detection region, in particular thus the power distribution with respect to the transmission signal, can also be set continuously and depending on the spacing of the oncoming traffic in this case. In this way, the interference resistance can be increased in motor vehicles driving in the opposite direction.

This is based on the concept that the front surroundings sensors in motor vehicles are primarily used to monitor the intervals to the preceding road users or road users to be passed, for example in the case of ACC systems and/or lane change assistants, thus to motor vehicles driving in the same direction. Oncoming further road users are more likely to be filtered out as objects in the surroundings sensors. In particular, when the motor vehicle is operated on a motorway, oncoming motor vehicles are assessed as rather irrelevant objects.

It is therefore proposed that the detection of the surroundings sensors be concentrated on the ego lane, therefore emitting the power into relevant regions and blocking out less relevant regions, in order to increase the interference resistance of the surroundings sensors. In particular, it is also conceivable that by adapting the detection region, specifically the emission characteristic, the transmission signals are emitted in certain relevant regions, in particular on the ego lane and/or adjacent lanes having the same direction of travel, with more range or more performance. In motorway scenarios, for example, it is conceivable to focus on the ego lane, which contains the lanes in the same direction of travel, and not to measure on the other side of the motorway if this could impair the surroundings sensors of further road users. In other words, the power distribution of the emitted power in space can be modeled in real time, for example by beamforming, in such a way that the power emitted in the region of the oncoming motor vehicles relevant for its measurement, and thus the interference, is minimized.

The case discussed here of oncoming other road users primarily relates to surroundings sensors aligned in the direction of travel of the ego motor vehicle, whereby an application to laterally measuring surroundings sensors and/or surroundings sensors measuring in the rear area of the motor vehicle is also possible in principle, for example if the oncoming further road user is presently passing or has already passed the ego vehicle.

In the scope of the present invention, it can also be provided that, in the case of an item of classification information describing a directly preceding road user, the detection region is restricted to a lateral component of the presently traveled lane, in particular one half of the presently traveled lane. In the case of another road user on the ego lane who is driving immediately ahead, the lane can, for example, be "divided" for a surroundings sensor that measures forwards and one that measures backwards for another road user who is immediately ahead, so that both surroundings sensors are still capable of detecting and tracking the respective other motor vehicle, but mutual interference can nonetheless at least be reduced. Depending on the traffic information available, the division can also take place essentially dynamically in such a way that both motor vehicles are also able to continue to detect each other due to the particularly cooperative adaptation of the detection regions.

In a particularly preferred embodiment of the present invention, it can be provided that for at least one item of classification information, in particular in the case of an item of classification information describing one of the further road users as a potential collision object and/or as not having at least one potentially interfering surroundings sensor and/or the other road user as a relevant object for a vehicle function using the sensor data of the surroundings sensor, no adaptation of the detection region takes place. In particular for highly relevant further road users or those for whom a possible interference with local sensors can be ruled out, an adaptation of the detection region from a maximum provided basic detection area region can therefore also be suppressed. If the traffic information contains, for example, the information that the further road user does not have any surroundings sensors in the relevant direction, no interference from their surroundings sensors can occur, so that an adaptation of the detection region is not necessary. If, for example, there is collision monitoring in the ego motor vehicle and a very high collision probability has been calculated for the other road user, it can be useful to forego adapting the detection region in order to be able to carry out high-quality measures to avoid collisions and/or reduce the consequences of collisions. If the further road user is highly relevant for a vehicle function that uses the sensor data of the surroundings sensor, for example in the case of an ACC system of the directly preceding road user, it is also possible to forgo an adaptation of the detection region in order to be able to ensure its further tracking. It should also be noted at this point that it can also be formulated that the adaptation takes place for all further road users that are assessed as not relevant for the at least one vehicle function using the sensor data of the surroundings sensor. This applies, for example, in many cases to the oncoming traffic, as already explained above.

It should be noted at this point that the classification information does not only have to be based on items of position information or movement information of the further road user, for example, but can also be based on sensor-based class or type recognition of the further road user and the like. In addition, communication data obtained via motor vehicle-to-motor vehicle communication can also be extremely useful for determining the classification information.

In general, it can be expediently provided within the scope of the present invention that the time curve of the adaptation of the detection region is selected in dependence on at least one item of traffic information describing the movement of the further road user. For example, in particular if the further road user cannot be tracked or cannot be tracked quickly enough, its movement can be precalculated based on the traffic information describing the movement of the further road user in order to carry along the adaptation of the detection region, so to speak.

Within the scope of the present invention, it is furthermore preferred if the adaptation of the detection region at least partially takes place according to a rule set which is provided for multiple motor vehicles, in particular also at least one further road user, describes a cooperative, in particular complementary adaptation of the detection regions of surroundings sensors of different road users for at least one traffic situation, and evaluates the traffic information. Such a definition of a rule set, which is ideally available and can be used for all participating motor vehicles, avoids the need for mutual coordination of motor vehicles by motor vehicle-to-motor vehicle communication or the like and thus provides adaptation rules for the detection region suitable for typical traffic situations, the use of which will at least reduce the interference with surroundings sensors of the further road users. For example, for oncoming traffic, blocking out of typical detection regions of oncoming road users on the lane of the oncoming road user can be defined in the emission characteristic. Similar rules are also conceivable for other traffic situations, for example in the case of the division of the ego lane and the like described above. The level of detail of the rule set can depend on the level of detail of the traffic information here, so that, for example, if the equipment of certain classes of other road users with surroundings sensors and their properties are known, rules tailored to corresponding classes can exist.

If the rule set is present in as many motor vehicles as possible, a cooperative adaptation of the detection regions usually occurs in order to minimize mutual interference.

In the context of the present invention, however, it is also conceivable that the adaptation of the detection region takes place at least partially on the basis of mutual coordination with the further road user using a communication link with the further road user. In this less preferred design, for example, common mutual coordination processes, as have already been proposed for other cases, can be implemented, in particular using appropriate negotiation algorithms.

In addition to the method, the present invention also relates to a motor vehicle having at least one distance-measuring surroundings sensor, in particular a radar sensor and/or lidar sensor, wherein the surroundings sensor measures in an adaptable detection region by emitting a transmission signal and receiving a reception signal resulting from reflection of the transmission signal, and a control device designed to carry out the method according to the invention. All statements relating to the method according to the invention may be applied analogously to the motor vehicle according to the invention, with which the above-mentioned advantages can thus also be obtained.

BRIEF DESCRIPTION

Figure 2:
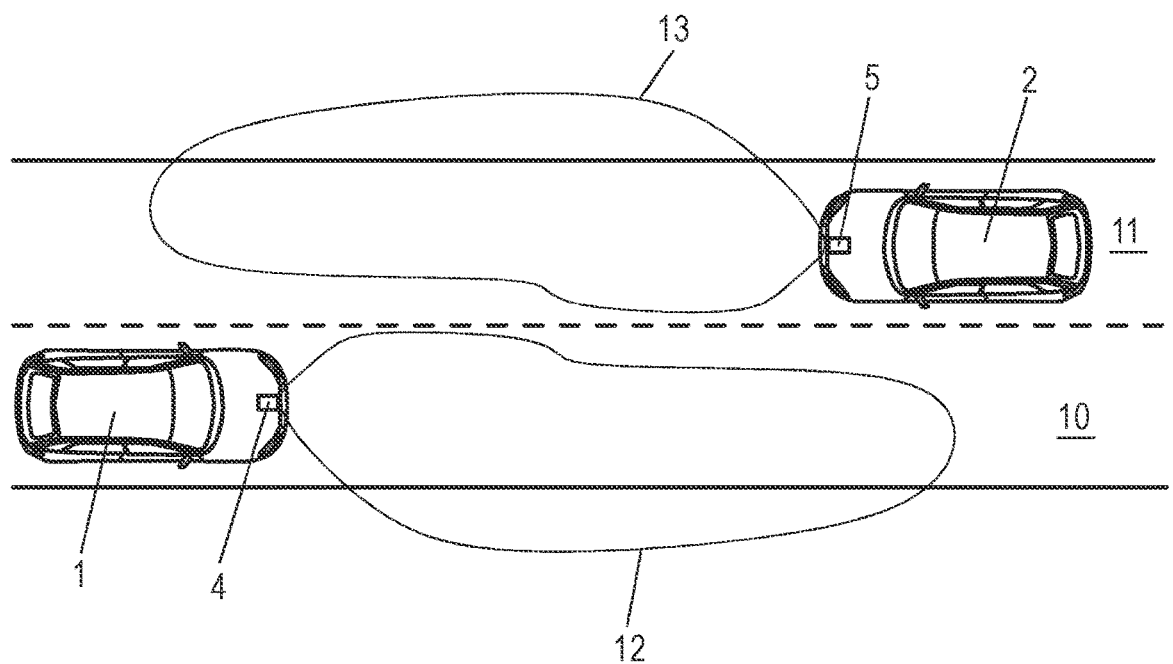
Figure 3:
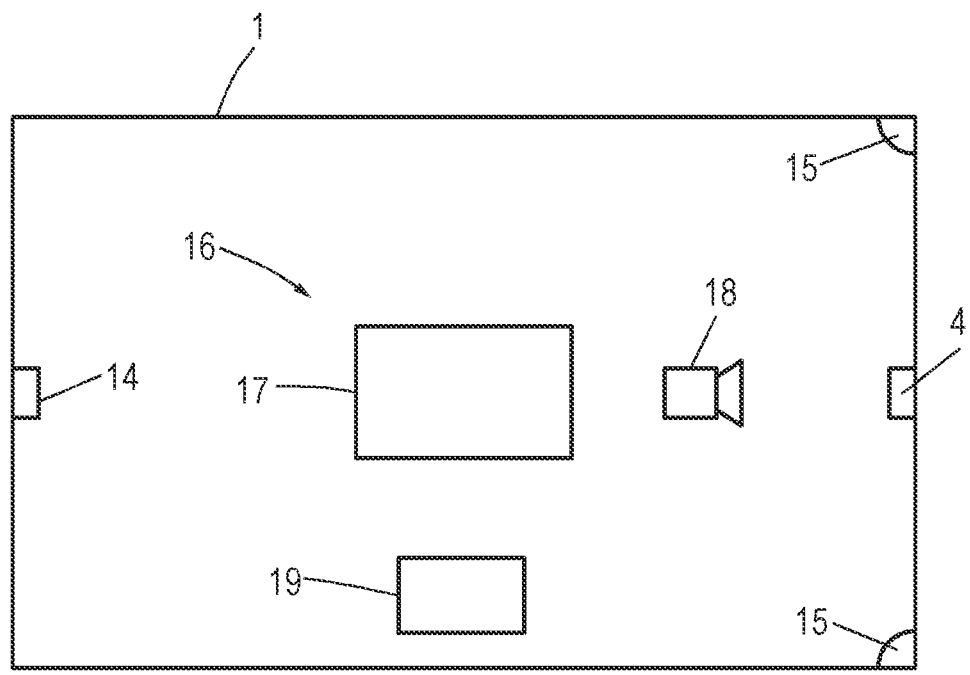

Further advantages and details of the present invention will be apparent from the exemplary embodiments described below and in reference to the drawings. In the figures:

FIG. 1 shows a traffic situation having two motor vehicles, in which mutual interference of surroundings sensors occurs, FIG. 2 shows the traffic situation of FIG. 1 having adapted detection regions and thus minimization of the interference, and FIG. 3 shows a schematic sketch of a motor vehicle according to the invention.

DETAILED DESCRIPTION

FIG. 1 shows a traffic situation having two motor vehicles 1, 2 approaching one another on a road 3. Both motor vehicles in the present case have at least one radar sensor 4, 5 oriented towards the area in front of the respective motor vehicle 1, 2 as a surroundings sensor.

Furthermore, the basic detection regions 6, 7 of the respective radar sensors 4, 5 used in FIG. 1, which correspond in the present case to the emission regions, thus the emission characteristic, are shown. An overlap region 8 obviously exists. Moreover, the respective other radar sensors 4, 5 are also located inside the basic detection regions 7, 6 of the respective other radar sensor 5, 4, therefore interference of the recording operation for both radar sensors 4, 5 can occur, as indicated by the bar 9.

This is where the method according to the invention comes into play, in that it is carried out by control units, in particular control devices, in the respective motor vehicles 1, 2.

Specifically, an item of traffic information about the other motor vehicle 1, 2 as a further road user is used to adapt the detection regions starting from the basic detection regions 6, 7 in real time in such a way that interference is minimized between the radar sensors 4, 5. The traffic information, which can be determined from sensor data of the respective radar sensors 4, 5 themselves and possibly using additional surroundings sensors of the respective motor vehicle 1, 2, but can also incorporate communication data of a motor vehicle-to-motor vehicle communication, comprises in the present case, in addition to the position and orientation of the respective other motor vehicle 1, 2 in relation to the ego motor vehicle 2, 1, items of movement information of the respective other motor vehicle 1, 2 and an item of classification information, which, in the present case, at least describes that the motor vehicles 1, 2 are approaching one another on other lanes 10, 11 of the road 3.

In the present exemplary embodiment, the radar sensors 4, 5, which are oriented towards the area in front of the respective motor vehicle 1, 2, are used as an example of an ACC system of the respective motor vehicle 1, 2, for which motor vehicles on the roadway 11, 10 respectively corresponding to the opposite direction to the ego direction of travel can be considered to be not relevant to the corresponding ACC function. Such an item of classification information triggers a specific adaptation of the detection regions starting from the basic detection regions 6, 7, as is shown by the adapted detection regions 12, 13 of FIG. 2. It is apparent that the respective other lanes 11, 10 are blocked out in the detection regions 12, 13 at least in the region in which the respective other radar sensor 5, 4 wishes to detect. In other words, the power distribution of the emitted power of the respective radar sensors 4 and 5 is reduced to the ego lane 10 or 11, so that mutual interference of the radar sensors 4 and 5 is largely, in particular completely, avoided and all relevant sensor data can still be obtained.

In the case of other items of classification information, there can of course also be other behaviors with regard to the detection regions 12, 13, which otherwise are generally adapted in real time. If the classification information indicates, for example, that a further road user has no surroundings sensor at all that could be disturbed, an adaptation can also be avoided and the corresponding basic detection region 6, 7 can continue to be used. Further road users relevant for powered vehicle functions can in principle continue to be detected, wherein it is conceivable here in specific exemplary embodiments, for example, to divide the space between the motor vehicles 1, 2 so that both can continue to detect nonetheless.

In the control unit performing the method, a rule set that is the same for the motor vehicles 1, 2 is stored in this regard, which makes it possible to determine suitable adapted detection regions 12, 13 from the respective traffic information, in particular comprising the classification information, or also to establish that adaptation does not have to be carried out starting from the basic detection regions 6, 7. In other exemplary embodiments, coordination via motor vehicle-to-motor vehicle communication between motor vehicles 1, 2 is also conceivable.

The procedure described here with respect to the radar sensors 4, 5 can of course also be used for other surroundings sensors actively measuring in certain frequency bands, for example lidar sensors.

Finally, FIG. 3 shows a schematic sketch of the motor vehicle 1 according to the invention. In the present case, in addition to the radar sensor 4, it has a further radar sensor 14 for the rear area and lidar sensors 15 oriented on the front area, the detection regions of which, thus specifically emission regions/emission characteristics, can be adapted as needed according to the method according to the invention. To carry out the method according to the invention, the motor vehicle 1 has a control unit 17 implemented as or in a control device 16. This can also use sensor data from further surroundings sensors, for example a camera 18, to determine the traffic information; optionally, the motor vehicle 1 can also have a communication device 19 for motor vehicle-to-motor vehicle communication.

The invention claimed is:

1. A method for operating at least one distance-measuring surroundings sensor, in particular a radar sensor and/or a lidar sensor, of a motor vehicle, wherein the surroundings sensor measures in an adaptable detection region by emitting a transmission signal and receiving a reception signal resulting due to reflection of the transmission signal, wherein the detection region is adapted in dependence on an item of traffic information describing at least one further road user, in particular a further motor vehicle, in relation to an ego motor vehicle to reduce interference between the surroundings sensor of the motor vehicle and at least one surroundings sensor of the further road user, wherein an adaptation of the detection region takes place in dependence on an item of classification information contained in the traffic information and/or derived from it and describing the traffic relationship between the motor vehicle and the further road user, wherein in the case of an item of classification information describing a further road user approaching in another lane, the detection region of the surroundings sensor is adapted to at least partially omit the lane of the further road user.

2. The method as claimed in claim 1, wherein the detection region is adapted by digital beamforming, in particular using phase shifters in a transmission path of the surroundings sensor, and/or by adapting the emission power.

3. The method as claimed in claim 2, wherein the traffic information includes a position and orientation of the further road user in relation to the motor vehicle and/or is at least partially determined from sensor data from the at least one surroundings sensor itself and/or from a further surroundings sensor of the motor vehicle and/or from communication data of a communication device of the motor vehicle, in particular by way of motor vehicle-to-motor vehicle communication.

4. The method as claimed in claim 1, wherein the traffic information includes a position and orientation of the further road user in relation to the motor vehicle and/or is at least partially determined from sensor data from the at least one surroundings sensor itself and/or from a further surroundings sensor of the motor vehicle and/or from communication data of a communication device of the motor vehicle, in particular by way of motor vehicle-to-motor vehicle communication.

5. The method as claimed in claim 4, wherein the traffic information is furthermore determined comprising a movement velocity and/or a movement direction of the at least one further road user.

6. The method as claimed in claim 1, wherein an omitted portion of the lane of the further road user removed from the detection region is located in front of the further road user and/or comprises a determined detection region of the further of the at least one surroundings sensor of the other road user in this lane.

7. The method as claimed in claim 6, wherein in the case of an item of classification information describing a directly preceding road user, the detection region is restricted to a lateral component of a presently traveled lane, in particular one half.

8. The method as claimed in claim 1, wherein in the case of an item of classification information describing a directly preceding road user, the detection region is restricted to a lateral component of a presently traveled lane, in particular one half.

9. The method as claimed in claim 1, wherein for at least one item of classification information, in particular in the case of an item of classification information describing one of the further road users as a potential collision object and/or as not having at least one potentially interfering surroundings sensor and/or describing the further road user as a relevant object for a vehicle function using the sensor data of the surroundings sensor, no adaptation of the detection region takes place.

10. The method as claimed in claim 1, wherein a time curve of an adaptation of the detection region is selected in dependence on at least one item of traffic information describing a movement of the further road user.

11. The method as claimed in claim 1, wherein an adaptation of the detection region at least partially takes place according to a rule set which is provided for multiple motor vehicles, in particular also at least one further road user, describes a cooperative, in particular complementary adaptation of the detection regions of surroundings sensors of different road users for at least one traffic situation, and evaluates the traffic information.

12. The method according to claim 1, wherein an adaptation of the detection region takes place at least partially on the basis of mutual coordination with the further road user using a communication link with the further road user.

13. A motor vehicle, having at least one distance-measuring surroundings sensor, in particular a radar sensor and/or lidar sensor, wherein the surroundings sensor measures in an adaptable detection region by emitting a transmission signal and receiving a reception signal resulting from reflection of the transmission signal, and a control device designed to carry out a method according to claim 1.

* * * * *